United States Patent
Yamaoka et al.

(10) Patent No.: US 6,753,292 B2
(45) Date of Patent: *Jun. 22, 2004

(54) SILICA-BASED PHOTOCATALYST FIBER HAVING VISIBLE-LIGHT ACTIVITY AND PROCESS FOR THE PRODUCTION THEREOF

(75) Inventors: Hiroyuki Yamaoka, Ube (JP); Yoshikatu Harada, Ube (JP); Teruaki Fujii, Ube (JP)

(73) Assignee: Ube Industries, Ltd., Yamaguchi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/247,712

(22) Filed: Sep. 20, 2002

(65) Prior Publication Data

US 2003/0207758 A1 Nov. 6, 2003

(30) Foreign Application Priority Data

May 1, 2002 (JP) .................................. 2002-129590

(51) Int. Cl.$^7$ .................. B01J 21/08; B01J 21/12; C03C 13/00; D04H 1/00; D02G 3/00
(52) U.S. Cl. .................. 502/242; 502/240; 502/241; 502/243; 502/244; 502/245; 502/246; 502/247; 502/248; 502/249; 502/250; 502/251; 502/252; 502/253; 502/254; 502/256; 502/257; 502/258; 502/259; 502/260; 502/261; 502/262; 502/527.24; 501/35; 501/38; 501/95.2; 501/154; 442/335; 428/292.1; 428/364; 428/373; 428/375
(58) Field of Search .................. 502/240–262, 502/527.24; 442/335; 501/35, 38, 95.2, 154; 428/364, 373, 292.1, 375

(56) References Cited

U.S. PATENT DOCUMENTS

| | | | | | |
|---|---|---|---|---|---|
| 4,614,690 | A | * | 9/1986 | Yamamura et al. | 428/614 |
| 4,770,935 | A | * | 9/1988 | Yamamura et al. | 428/366 |
| 4,961,990 | A | * | 10/1990 | Yamada et al. | 428/240 |
| 5,240,888 | A | * | 8/1993 | Yamamura et al. | 501/95 |
| 5,874,375 | A | * | 2/1999 | Zoitos et al. | 501/36 |
| 6,541,416 | B2 | * | 4/2003 | Ishikawa et al. | 502/240 |
| 2003/0134121 | A1 | * | 7/2003 | Yamaoka et al. | 428/375 |

FOREIGN PATENT DOCUMENTS

EP    1 164 212    12/2001

* cited by examiner

Primary Examiner—Mark L. Bell
Assistant Examiner—Patricia L. Hailey
(74) Attorney, Agent, or Firm—Wenderoth, Lind & Ponack, L.L.P.

(57) ABSTRACT

A silica-based photocatalyst fiber having visible-light activity, which fiber comprises a composite oxide phase comprising an oxide phase (first phase) mainly made of a silica component and a titania phase (second phase), wherein the second phase contains a metal element other than titanium and the existent ratio of the second phase slopingly increases towards the surface of the fiber, and a process for the production thereof.

6 Claims, 2 Drawing Sheets

Spinning → Heat treatment → After calcination

SILICA-BASED PHOTOCATALYST FIBER HAVING VISIBLE-LIGHT ACTIVITY AND PROCESS FOR THE PRODUCTION THEREOF

FIELD OF THE INVENTION

The present invention relates to a high-strength inorganic fiber having excellent photocatalyst function and a process for the production thereof. Specifically, it relates to an inorganic fiber which shows excellent photocatalyst activity by visible light irradiation and a process for the production thereof.

BACKGROUND OF THE INVENTION

There have been made many attempts to decompose and purify various environmental pollutants by using an photocatalyst effect of a semiconductor typified by titanium dioxide. When the above photocatalyst effect is utilized, conventionally, titania crystal grains are fixed on a substrate. However, many problems occur on a bonding method so that in recent years a keen attention is focused on a titania fiber free from the fixation problem.

For example, JP-A-5-184923 discloses a method of synthesizing a fiber composed of crystals of anatase type titania and vanadium oxide, which method comprises dissolving titanium alkoxide and a vanadium compound in alcohol, carrying out hydrolysis to prepare a sol-like material, forming the sol-like material into a fiber-like material, gelating the fiber-like material and heat-treating the gel in the range of from 200 to 700° C. Examples of the above JP-A-5-184923 mainly discribe a fiber containing titania and vanadia and further containing quantities of a silica component. With regard to catalyst activity as a fabric using the above fiber, JP-A-5-184923 shows only the catalyst activity of a fabric obtained by mixing only 20% of the above fiber into an E glass made of silica.

Conventionally, it is known that a titania fiber synthesized by the sol-gel method is extremely fragile. As a study for increasing the strength thereof, for example, "Yogyo-Kyokai-shi", vol 94 (12), pages 1,243 to 1,245, (1986) describes coexistence of a silica component. The above method described in the examples of JP-A-5-184923 exactly adopts this method. Further, JP-A-11-5036 publication discloses a silica-titania fiber for a photocatalyst according to the sol-gel method and a production process thereof. In this case, the fiber also has an extremely low strength of 0.1 to 1.0 GPa.

In addition to the above methods, the following reports have been disclosed as a production process of titania. For example, "Journal of Material Science Letters" 5 (1986), 402–404, reports a method of synthesizing a gel-like titania fiber (anatase) in which hydrochloric acid coexists in an alcohol solution of titanium alkoxide, hydrolysis is carried out to obtain a colloidal substance, the colloidal substance is spun, and the spun fiber is heated under a humidified atmosphere and then temperature-increased in air to obtain a gel-like titania fiber.

Further, "The American Ceramic Society Bulletin", May 1998, 61–65, reports a method of producing a titania fiber by adding water to fine particles of titania to obtain a slurry, mixing the slurry with viscose to prepare a viscous fluid, forming the viscous fluid into a fiber and calcining the fiber in air under heat at a high temperature.

Each of these fibers is formed through an agglomeration step of primary particles of titania so that the inside of each fiber has a serious defect. Even when photocatalyst function is recognized, it is extremely fragile. Accordingly, it is required to solve many problems for practical uses. Further, in systems where a silica component coexists in order to improve strength, titania and silica exist in a mixed state so that these systems can not provide sufficient photocatalyst activity when compared with titania alone. This is also a significant problem against practical uses.

When a photocatalyst fiber is used as a filter, it is naturally preferred that the photocatalyst fiber has a higher fiber strength since the photocatalyst fiber is exposed to a high-speed gas flow for a long period of time. Particularly, in consideration of its application to a gas emitted from an aircraft engine or a motor vehicle engine, it is strongly desired to develop a fiber having high-strength photocatalyst function or thermal-catalyst function that goes beyond conventional common sense.

On the other hand, irradiation of ultraviolet light of 400 nm or less is indispensable for making titania exert photocatalyst function. In the spectral distribution of solar rays, which can be obtained on the surface of the earth, the ultraviolet region (400 nm or less) is approximately 5%, the visible region (400 to 750 nm) is approximately 43%, and the infrared region (750 nm or more) is approximately 52%. Therefore, a photocatalyst which exerts photocatalyst function in the visible region is desired for utilizing solar rays efficiently.

As a method for the above, for example, JP-A-9-192496 discloses a method in which a metal element such as V, Cr, Mn, Fe, Co, Ni, Cu, etc., is doped into titanium oxide. This method produces a photocatalyst by adding the above dopant or its precursor to titanium oxide or its precursor such as hydroxide, chloride or nitrate and carrying out drying and then calcination. However, since it is difficult to introduce the metal as a dopant into titanium oxide homogeneously and highly dispersively, there is a problem that sufficient visible light activity can not be obtained.

Further, JP-A-9-262482 discloses a method in which titanium oxide is irradiated with a metal ion, such as Cr, V, Cu or Fe, accelerated to high energy, to introduce the metal ion into the titanium oxide. According to this method, the metal ion can be homogeneously and highly dispersively introduced into the titanium oxide. However, it requires a large-scale manufacturing equipment so that a manufacturing cost becomes high. Therefore, the problem is that the above method is unsuitable to mass production.

SUMMARY OF THE INVENTION

It is an object of the present invention to provide a high-strength inorganic fiber which exerts excellent photocatalyst activity by visible light irradiation and a process for the production thereof.

According to the present invention, there is provided a silica-based photocatalyst fiber having visible-light activity, which fiber comprises a composite oxide phase comprising an oxide phase (first phase) mainly made of a silica component and a titania phase (second phase), wherein the second phase contains a metal element other than titanium and the existent ratio of the second phase slopingly increases towards the surface of the fiber.

According to the present invention, further, there is provided a process for the production of a silica-based photocatalyst fiber, which process comprises melt-spinning a modified polycarbosilane obtainable by modifying a polycarbosilane having a main chain structure represented by the formula,

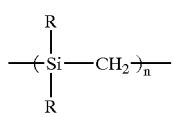

(in which R is a hydrogen atom, a lower alkyl group or a phenyl group) and a number average molecular weight of 200 to 10,000, with an organic metal compound or melt-spinning a mixture of the modified polycarbosilane and an organic metal compound, to obtain a spun fiber;

infusibilizing the spun fiber; and calcining the infusible fiber in air or in oxygen.

DETAILED DESCRIPTION OF THE INVENTION

Figure 1:
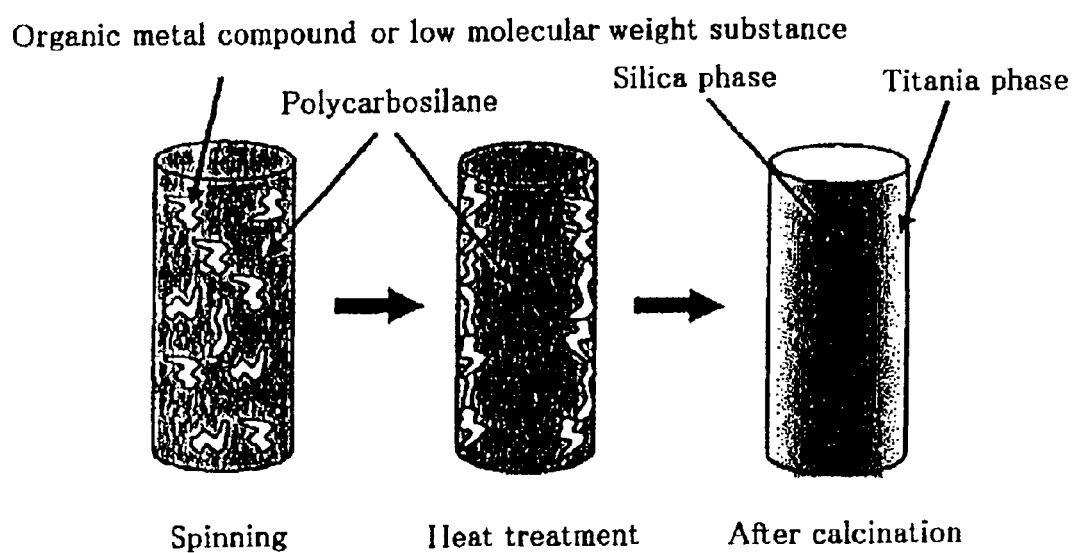
FIG. 1 is a schematic illustration showing steps of generating an oxide fiber having a slope structure, provided by the present invention.

The present inventors have found that a dense silica fiber having high strength can be obtained by heat-treating a precursor fiber made of an organosilicon polymer and then calcining the heat-treated precursor fiber in air at a high temperature. Then, the present inventors have found that when a low molecular-weight organic metal compound or a reaction substance of a low molecular-weight organosilicon polymer with a low molecular-weight organic metal compound coexists in the above organosilicon polymer, low molecular weight substances including the above organic metal compound component selectively move to a fiber surface by bleeding in a heat-treatment step after spinning and an oxide layer (oxide layer having an intended catalyst function) derived from the above low molecular weight substances is effectively formed on the fiber surface by calcination in air after the heat-treatment. Furthermore, it is also found that fibers obtained according to the above method are remarkably dense and have high strength. The step of producing silica from the organosilicon polymer as a starting material includes an oxidation step converting a silicon-carbon bond to a silicon-oxygen bond. In this step, its volume is expected to increase by approximately 1.37 times. Since this change is attained at a relatively low temperature of at least 600° C., a dense silica-based composite fiber is effectively obtained by the calcination. It is estimated that the increase in strength described above is accordingly attained.

Further the following has been found. When a compound of titanium and a compound of a metal element other than titanium are used as an organic metal compound, a generated oxide layer is a layer in which the metal other than titanium is uniformly and high dispersively introduced in a titanium phase. As a result, an obtained photocatalyst fiber exerts excellent visible light activity.

That is, the present invention is directed to a silica-based photocatalyst fiber formed of a composite oxide phase comprising an oxide phase (first phase) mainly made of a silica component and a titania phase (second phase), which fiber is characterized in that the second phase contains a metal element other than titanium and the existent ratio of the second phase slopingly increases towards the surface layer of the fiber.

In the present invention, the oxide phase (first phase) mainly made of a silica component may be amorphous or crystalline. Further, it may contain a metal element or a metal compound which can form a solid solution or a eutectic compound with silica. Although a metal element (A) which can form a solid solution with silica or a metal element (B) whose oxide can form a compound having a specific constitution with silica is not specially limited, for example, (A) includes titanium and (B) includes aluminum, zirconium, yttrium, lithium, sodium, barium, calcium, boron, zinc, nickel, manganese, magnesium and iron.

The first phase forms an inside phase of the fiber provided by the present invention and it plays an important role in covering mechanical properties. The existent ratio of the first phase based on the fiber as a whole is preferably 98 to 40% by weight. It is preferred to control the existent ratio of the first phase in the range of from 95 to 50% by weight for exerting the intended functions of the second phase sufficiently and exerting high mechanical properties concurrently.

On the other hand, the titania phase which constitutes the second phase plays an important role in exerting the intended photocatalyst function in the present invention. The existent ratio of the second phase which constitutes a surface layer portion of the fiber is preferably 2 to 60% by weight. It is preferred to control the existent ratio of the second phase in the range of from 5 to 50% by weight for exerting its functions sufficiently and exerting high strength concurrently.

Further, for exerting visible light activity, it is indispensable to incorporate a metal element other than titanium in the second phase. As such a metal element, there is used at least one metal element selected from Fe, W, Bi, V, Cr, Mn, Co, Ni, Cu, Mg, Ag, Pd, Pt, Zn, Ru, Ce and Rh. For exerting the intended visible light activity sufficiently, the ratio of the metal element other than titanium in the second phase, based on the second phase as a whole, is preferably 5 to 40% by weight calculated as its oxide.

The existent ratio of the second phase, i.e. the existent ratio of fine crystal grains which are a constituent of the second phase, slopingly increases towards the fiber surface. The thickness of a region where the slope in the constitution is apparently recognized is preferably controlled in the range of 5 to 500 nm. The slope region may reach to approximately ⅓ of the diameter of the fiber. In the present invention, further, each of the "existent ratios" of the first phase and the second phase independently refers to "% by weight" of a metal oxide of the first phase or a metal oxide of the second phase based on the whole metal oxides composed of the metal oxide which constitutes the first phase and the metal oxide which constitutes the second phase, i.e., based on the whole fiber.

The process for the production of the silica-based photocatalyst fiber having a slope structure, provided by the present invention, will be explained hereinafter.

A modified polycarbosilane obtainable by modifying a polycarbosilane which has a main chain structure represented by the formula,

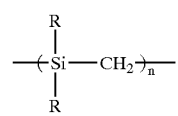

(in which R is a hydrogen atom, a lower alkyl group or a phenyl group) and a number average molecular weight of 200 to 10,000, with an organic metal compound is melt-spun or a mixture of the modified polycarbosilane and an organic metal compound is melt-spun, to obtain a spun fiber; the spun fiber is infusibilized; and then the infusible fiber is calcined in air or in oxygen, whereby the silica-based photocatalyst fiber can be produced.

The first step of the present invention's process is a step of producing a modified polycarbosilane having a number average molecular weight of 1,000 to 50,000 as a starting material used for producing the silica-based photocatalyst fiber. The fundamental production process of the above modified polycarbosilane is remarkably similar to the production process of JP-A-56-74126. However, in the present invention, it is required to carefully control the bonding state of a functional group described in JP-A-56-74126. The general outlines thereof will be explained hereinafter.

The modified polycarbosilane as a starting material is derived mainly from a polycarbosilane having a main chain structure represented by the formula,

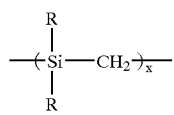

(in which R is a hydrogen atom, a lower alkyl group or a phenyl group) and x is sufficient to provide a number average molecular weight of 200 to 10,000 and an organic metal compound having a basic structure of the formula M(OR')n or the formula MR"m (in which M is a metal element, R' is an alkyl group having 1 to 20 carbon atoms or a phenyl group, R" is acetyl acetonate, and each of m and n is an integer of more than 1, preferably, is an integer of more than 1 to less than 6).

For producing the fiber having a slope constitution, provided by the present invention, it is required to select slow reaction conditions under which only part of the organic metal compound forms a bond with the polycarbosilane. For the above purpose, it is required to carry out the reaction at a temperature of 280° C. or lower, preferably 250° C. or lower, in an inert gas. Under the above reaction conditions, even when the above organic metal compound is reacted with the polycarbosilane, it bonds as a monofunctional polymer (i.e., a pendant-like bonding) and no large increase in molecular weight occurs. The thus-obtained modified polycarbosilane in which the organic metal compound is partially bonded plays an important role in improving the compatibility between the polycarbosilane and the organic metal compound.

When two or more functional groups are bonded, the polycarbosilane forms a cross-linking structure and a noticeable increase in molecular weight is observed. In this case, sudden heat generation and an increase in melt viscosity occur in the reaction. On the other hand, when only one functional group is reacted as described above and an unreacted organic metal compound remains, conversely, a decrease in melt viscosity is observed.

In the present invention, it is preferred to select conditions under which an unreacted organic metal compound is intentionally left. The present invention uses mainly, as a starting material, a material in which the above modified polycarbosilane coexists with an organic metal compound which is in an unreacted state or an organic metal compound which is dimer, trimer or so. However, the modified polycarbosilane alone can be similarly used as a starting material when the modified polycarbosilane contains a modified polycarbosilane component having an extremely low molecular weight.

In the second step of the present invention's process, the modified polycarbosilane obtained in the first step or a mixture of the modified polycarbosilane and a low molecular-weight organic metal compound is molten to form a spinning solution, optionally the spinning solution is filtered to remove substances which are to be detriment at the time of spinning such as a microgel or impurities, and the spinning solution is spun with a generally used synthetic fiber-spinning machine. While the temperature of the spinning solution at the spinning time differs depending upon the softening temperature of the modified polycarbosilane as raw materials, it is advantageous to select a temperature in the range of from 50 to 200° C. The above spinning machine may be provided with a humidifying and heating cylinder in a nozzle bottom portion as required. The diameter of a fiber is adjusted by changing the amount of ejection from a nozzle and the take-up speed of a high-speed take-up unit attached to a bottom portion of the spinning machine. Further, according to the melt-blow method or the spun-bond method, a fiber discharged from the nozzle may be directly molded into a felt shape without winding it.

In addition to the above-described melt spinning, the second step of the present invention's process can give an intended fiber by dissolving the modified polycarbosilane obtained in the first step or a mixture of the modified polycarbosilane and low molecular-weight organic metal compound in, for example, benzene, toluene, xylene or a solvent which can dissolve the modified polycarbosilane and the low molecular-weight organic metal compound, to form a spinning solution, optionally filtering the spinning solution to remove substances which are to be detriment at the time of spinning such as a microgel or impurities, and spinning the spinning solution with a generally used synthetic fiber-spinning machine by a dry spinning method while controlling the take-up speed.

In these spinning steps, a spinning cylinder may be attached to the spinning machine as required. An atmosphere in the cylinder is replaced with a mix atmosphere mixed with at least one gas selected from the above solvents or replaced with an atmosphere of air, an inert gas, heated air, a heated inert gas, steam, an ammonia gas, a hydrocarbon gas or an organosilicon compound gas, whereby solidification of a fiber in the spinning cylinder can be controlled.

Next, in the third step of the present invention's process, the above spun fiber is preliminarily heated in an oxidizing atmosphere under the action of tension or no tension, to infusibilize the spun fiber. The purpose of this step is to prevent the fiber from melting in the following calcination step and to prevent adjacent fibers from bonding to each other. The temperature for the treatment and the time for the treatment differ depending upon a constitution. Although not specially limited, generally, the treatment is carried out in the range of 50 to 400° C. for several hours to 30 hours. The above oxidizing atmosphere may contain moisture, nitrogen oxide, ozone, etc., which increase the oxidation strength of the spun fiber, and an oxygen partial pressure may be changed intentionally.

In some cases, the softening temperature of the spun fiber becomes less than 50° C. according to the ratio of substances having a low molecular weight in raw materials. In these cases, a treatment for promoting the oxidation of a fiber surface is previously carried out at a temperature lower than the above treatment temperature in some cases. In the third step and the second step, there is advanced the bleedout of the low-molecular weight organic metal compound, contained in the raw material, to the fiber surface. It is considered that the ground of an intended slope constitution is accordingly formed.

In the next fourth step of the present invention's process, the above infusible fiber is calcined under tension or no tension at a temperature in the range of 500 to 1,800° C. in an oxidizing atmosphere, to obtain the intended silica-based photocatalyst fiber formed of a composite oxide phase comprising an oxide phase (first phase) mainly made of a silica component and a titania phase (second phase), in which the second phase contains a metal element other than titanium and the existent ratio of the second phase slopingly increases towards the surface layer of the fiber. In this step, organic components contained in the infusible fiber are fundamentally oxidized. However, in some cases, the organic components remain in the fiber as carbon or carbide according to selected conditions. Even such a fiber may be used as it is so long as there is caused no hitch with regard to intended functions. When some hitches are caused, a further oxidizing treatment is carried out. In this case, it is required to select a temperature and a treatment time which cause no problems concerning an intended slope constitution and an intended crystal structure.

FIG. 1 schematically shows steps of the generation of an oxide fiber having an intended slope constitution, provided by the present invention.

EXAMPLES

The present invention will be explained with reference to Examples.

Referential Example 1

2.5 liters of anhydrous toluene and 400 g of metallic sodium were placed in a three-necked flask having a volume of 5 liters, the mixture was heated to the boiling point of toluene under a flow of nitrogen gas, and 1 liter of dimethyldichlorosilane was dropwise added over 1 hour. After the completion of the addition, the mixture was refluxed under heat for 10 hours to obtain a precipitate. The precipitate was recovered by filtration, and washed with methanol and then with water to give 420 g of a white powder polydimethylsilane.

250 g of the polydimethylsilane was placed in a three-necked flask equipped with a water-cooling refluxing device, and allowed to react under heat at 420° C. for 30 hours under a flow of nitrogen gas, to obtain a polycarbosilane having a number average molecular weight of 1,200.

Example 1

100 g of toluene, 50 g of tetrabutoxytitanium and 5 g of iron (III) acetyl acetonate were added to 50 g of polycarbosilane synthesized according to Referential Example 1, the mixture was preliminarily heated at 100° C. for 1 hour, then, the mixture was slowly temperature-increased up to 150° C. to distill the toluene off, the resultant mixture was allowed to react at the above temperature for 5 hours, and then the reaction mixture was further temperature-increased up to 250° C. and allowed to react at this temperature for 5 hours, to obtain a modified polycarbosilane. 5 g of tetrabutoxytitanium was added to the modified polycarbosilane for the purpose of intentionally making a low-molecular weight organic metal compound coexist, to obtain a mixture of the modified polycarbosilane and the low-molecular weight organic metal compound.

The mixture of the modified polycarbosilane and the low-molecular weight organic metal compound was dissolved in toluene, the resultant solution was placed in a spinning machine made of glass, it was temperature-increased in the spinning machine in which nitrogen had been sufficiently substituted to distill the toluene off and the resultant material was melt-spun at 180° C.

The spun fiber was stepwise heated up to 150° C. in air to form an infusible fiber, and the infusible fiber was calcined in air at 1,200° C. for 1 hour, to obtain a silica-based photocatalyst fiber.

The obtained fiber (average diameter: 13 $\mu$m) was analyzed for the contained ratio of each element using fluorescent X-ray. The amount of silica was 80% by weight, the amount of titania was 17% by weight and the amount of iron oxide was 3% by weight, calculated as each oxide. Further, the fiber was examined for the distribution state of constitutive atoms by EPMA (electro probe microanalysis). The molar ratio of Ti/Si was 0.87 in the region of from the outermost periphery portion to a depth of 1 $\mu$m, the molar ratio of Ti/Si was 0.15 in the region of from a depth of 3 $\mu$m to 4 $\mu$m below the outermost periphery, and the molar ratio of Ti/Si in the central portion was 0.04. Accordingly, it was confirmed that the fiber had a slope constitution in which titanium increased towards the surface. Similarly, the molar ratio of Fe/Si in the region of from the outermost periphery portion to a depth of 1 m was 0.08, the molar ratio of Fe/Si was 0.02 in the region of from a depth of 3 $\mu$m to 4 $\mu$m below the outermost periphery, and the molar ratio of Fe/Si in the central portion was 0.01. Accordingly, it was confirmed that the fiber had a slope constitution in which iron increased towards the surface. The fiber had a tensile strength of 1.7 GPa. The above tensile strength of the fiber was remarkably higher than that of an anatase type titania/silica fiber obtained by the conventional sol-gel method.

Figure 2:
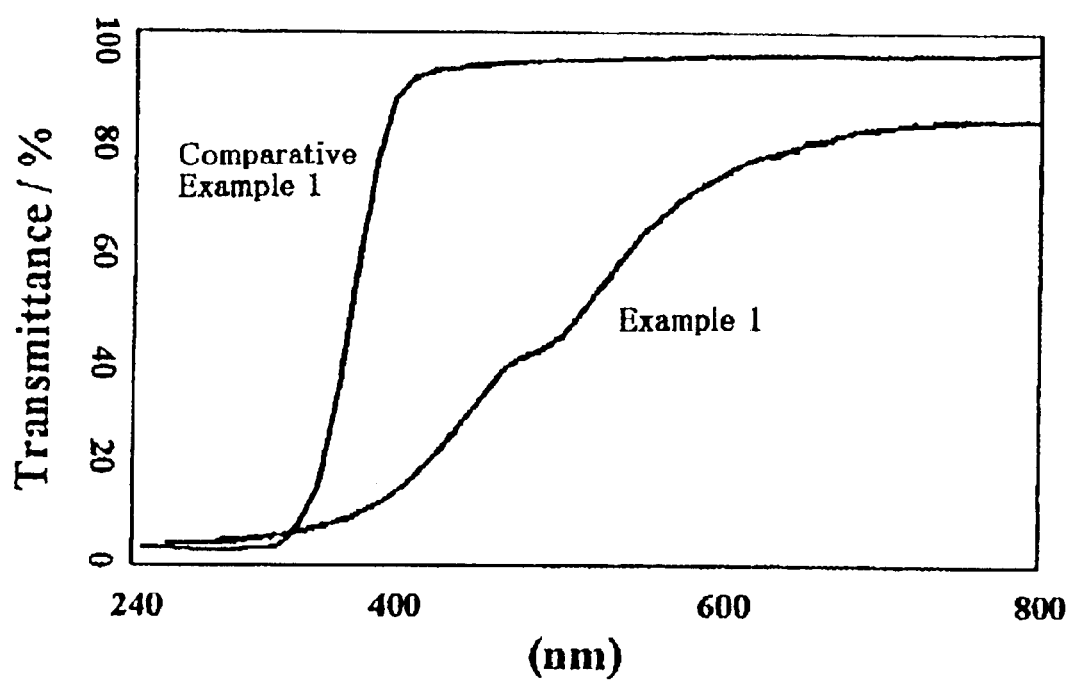
FIG. 2 is a diagram showing the absorption spectrums of fibers obtained in Example 1 and Comparative Example 1 of the present invention.

Further, the fiber was measured for absorption spectrums and FIG. 2 shows the results.

0.2 g of the above fiber was placed in a schale having a diameter of 60 mm. 20 milliliters of water having a coliform count of 1,000,000 per milliliter was added to the schale. The water was irradiated with a xenon lamp equipped with a filter which cut a light having a wavelength of 420 nm or less, from the upper side of the schale for 24 hours. After the irradiation, the coliform solution was taken from the schale and cultivated in an agar medium. Then, the number of residual coliform was checked. The number of residual coliform was 0. Photocatalyst activity under visible light irradiation was recognized.

Example 2

100 g of toluene, 50 g of tetrabutoxytitanium and 3 g of tungsten ethoxide were added to 50 g of polycarbosilane synthesized according to Referential Example 1, the mixture was preliminarily heated at 100° C. for 1 hour, then, the mixture was slowly temperature-increased up to 150° C. to distill the toluene off, the resultant mixture was allowed to react at the above temperature for 5 hours, and then the reaction mixture was temperature-increased up to 250° C. and allowed to react at this temperature for 5 hours, to obtain a modified polycarbosilane. 5 g of tetrabutoxytitanium was added to the modified polycarbosilane for the purpose of intentionally making a low-molecular weight organic metal compound coexist, to obtain a mixture of the modified polycarbosilane and the low-molecular weight organic metal compound.

The mixture of the modified polycarbosilane and the low-molecular weight organic metal compound was dissolved in toluene, the resultant mixture was placed in a spinning machine made of glass, the solution was temperature-increased in the spinning machine in which nitrogen had been sufficiently substituted to distill the toluene off and the resultant material was melt-spun at 180° C.

The spun fiber was stepwise heated up to 150° C. in air to form an infusible fiber, and the infusible fiber was calcined in air at 1,200° C. for 1 hour, to obtain a silica-based photocatalyst fiber.

The obtained fiber (average diameter: 13 μm) was analyzed for the contained ratio of each element using fluorescent X-ray. The amount of silica was 80% by weight, the amount of titania was 15% by weight and the amount of tungsten oxide was 5% by weight, calculated as each oxide. Further, the fiber was examined for the distribution state of constitutive atoms by EPMA. The molar ratio of Ti/Si was 0.85 in the region of from the outermost periphery portion to a depth of 1 μm, the molar ratio of Ti/Si was 0.13 in the region of from a depth of 3 μm to 4 μm below the outermost periphery, and the molar ratio of Ti/Si in the central portion was 0.04. Accordingly, it was confirmed that the fiber had a slope constitution in which titanium increased towards the surface. Similarly, the molar ratio of W/Si in the region of from the outermost periphery portion to a depth of 1 μm was 0.07, the molar ratio of W/Si was 0.02 in the region of from a depth of 3 μm to 4 μm below the outermost periphery, and the molar ratio of W/Si in the central portion was 0.01. Accordingly, it was confirmed that the fiber had a slope constitution in which tungsten increased towards the surface. The fiber had a tensile strength of 1.6 GPa. The above tensile strength of the fiber was remarkably higher than that of an anatase type titania/silica fiber obtained by the conventional sol-gel method.

0.2 g of the above fiber was placed in a schale having a diameter of 60 mm. 20 milliliters of water having a coliform count of 1,000,000 per milliliter was added to the schale. The water was irradiated with a xenon lamp equipped with a filter which cut a light having a wavelength of 420 nm or less, for 24 hours from the upper side of the schale. After the irradiation, the coliform solution was taken from the schale and cultivated in an agar medium. Then, the number of residual coliform was checked. The number of residual coliform was 0. Photocatalyst activity under visible light irradiation was recognized.

Comparative Example 1

100 g of toluene and 50 g of tetrabutoxytitanium were added to 50 g of polycarbosilane synthesized according to Referential Example 1, the mixture was preliminarily heated at 100° C. for 1 hour, then, the mixture was slowly temperature-increased up to 150° C. to distill the toluene off, the resultant mixture was allowed to react at the above temperature for 5 hours, and then the reaction mixture was temperature-increased up to 250° C. and allowed to react at this temperature for 5 hours, to obtain a modified polycarbosilane. 5 g of tetrabutoxytitanium was added to the modified polycarbosilane for the purpose of intentionally making a low-molecular weight organic metal compound coexist, to obtain a mixture of the modified polycarbosilane and the low-molecular weight organic metal compound.

The mixture of the modified polycarbosilane and the low-molecular weight organic metal compound was dissolved in toluene, the resultant solution was placed in a spinning machine made of glass, the solution was temperature-increased in the spinning machine in which nitrogen had been sufficiently substituted to distill the toluene off and the resultant material was melt-spun at 180° C.

The spun fiber was stepwise heated up to 150° C. in air to form an infusible fiber, and the infusible fiber was calcined in air at 1,200° C. for 1 hour, to obtain a titania/silica fiber.

The obtained fiber (average diameter: 13 μm) was analyzed for the contained ratio of each element using fluorescent X-ray. The amount of silica was 83% by weight, and the amount of titania was 17% by weight, calculated as each oxide. Further, the fiber was examined for the distribution state of constitutive atoms by EPMA. The molar ratio of Ti/Si was 0.85 in the region of from the outermost periphery portion to a depth of 1 μm, the molar ratio of Ti/Si was 0.13 in the region of from a depth of 3 μm to 4 μm below the outermost periphery, and the molar ratio of Ti/Si in the central portion was 0.04. Accordingly, it was confirmed that the fiber had a slope constitution in which titanium increased towards the surface. The fiber had a tensile strength of 1.8 GPa. The above tensile strength of the fiber was remarkably higher than that of an anatase type titania/silica fiber obtained by the conventional sol-gel method.

Further, the fiber was measured for absorption spectrums and FIG. 2 shows the results.

0.2 g of the above fiber was placed in a schale having a diameter of 60 mm. 20 milliliters of water having a coliform count of 1,000,000 per milliliter was added to the schale. The water was irradiated with a xenon lamp equipped with a filter which cut a light having a wavelength of 420 nm or less for 24 hours from the upper side of the schale. After the irradiation, the coliform solution was taken from the schale and cultivated in an agar medium. Then, the number of residual coliform was checked. It was found that the number of coliform was increased to 100,000,000. Photocatalyst activity under visible light irradiation was not recognized.

What is claimed is:

1. A silica-based photocatalyst fiber having visible-light activity, which fiber comprises a composite oxide phase comprising an oxide phase (first phase) mainly made of a silica component and a titania phase (second phase),
   wherein the second phase contains a metal element other than titanium and the existent ratio of the second phase slopingly increases towards the surface of the fiber.

2. The silica-based photocatalyst fiber according to claim 1, wherein the existent ratio of the first phase based on the fiber as a whole is 98 to 40% by weight and the existent ratio of the second phase based on the fiber as a whole is 2 to 60% by weight.

3. The silica-based photocatalyst fiber according to claim 2, wherein the existent ratio of the metal element other than titanium in the second phase, based on the second phase as a whole, is 5 to 40% by weight calculated as its oxide.

4. The silica-based photocatalyst fiber according to claim 1, wherein the metal element other than titanium in the second phase is at least one metal element selected from the group consisting of Fe, W, Bi, V, Cr, Mn, Co, Ni, Cu, Mg, Ag, Pd, Pt, Zn, Ru, Ce and Rh.

5. The process for the production of a silica-based photocatalyst fiber recited in claim 1, which process comprises
   melt-spinning a modified polycarbosilane obtained by modifying a polycarbosilane having a main chain structure represented by the formula,

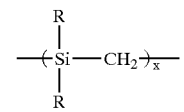

(in which R is a hydrogen atom, a lower alkyl group or a phenyl group) and X is sufficient to provide a number average molecular weight of 200 to 10,000, with an organic metal compound or melt-spinning a mixture of the modified polycarbosilane and an organic metal compound, to obtain a spun fiber;

infusibilizing the spun fiber; and calcining the infusible fiber in air or in oxygen.

6. The process according to claim 5, wherein the organic metal compound is a compound having a basic structure of the formula M(OR')n or the formula MR"m, in which M is a metal element, R' is an alkyl group having 1 to 20 carbon atoms or a phenyl group, R" is acetyl acetonate, and each of m and n is an integer of more than 1.

* * * * *